United States Patent [19]

Weber et al.

[11] 4,004,282
[45] Jan. 18, 1977

[54] CIRCUIT ARRANGEMENT FOR AN INTEGRATED DATA PROCESSING SYSTEM COMPOSED OF A SMALL NUMBER OF DIFFERENT CHIP TYPES WITH ALL CHIPS DIRECTLY CONNECTABLE TO A COMMON COLLECTING BUS

[75] Inventors: Gerald Weber; Jürgen Sorgenfrei, both of Braunschweig, Germany

[73] Assignee: Olympia Werke AG, Wilhelmshaven, Germany

[22] Filed: Dec. 20, 1974

[21] Appl. No.: 535,088

[30] Foreign Application Priority Data

Dec. 22, 1973 Germany .................... 2364303

[52] U.S. Cl. .......................................... 340/172.5
[51] Int. Cl.² ................. G06F 7/48; G06F 13/00
[58] Field of Search ...... 340/172.5, 173 R, 173 SP; 307/213, 238, 242, 303

[56] References Cited

UNITED STATES PATENTS

| | | | |
|---|---|---|---|
| 3,462,742 | 8/1969 | Miller et al. | 340/172.5 |
| 3,579,201 | 5/1971 | Langley | 340/172.5 |
| 3,597,641 | 8/1971 | Ayres | 307/303 |
| 3,668,650 | 6/1972 | Wang | 340/172.5 |
| 3,702,988 | 11/1972 | Haney et al. | 340/172.5 |
| 3,757,306 | 9/1973 | Boone | 340/172.5 |
| 3,757,308 | 9/1973 | Fosdick | 340/172.5 |
| 3,758,761 | 9/1973 | Henrion | 340/172.5 X |
| 3,798,606 | 3/1974 | Henle et al. | 340/172.5 |
| 3,821,715 | 6/1974 | Hoff, Jr. et al. | 340/172.5 |
| 3,855,577 | 12/1974 | Vandierendonck | 340/172.5 |
| 3,878,514 | 4/1975 | Faber | 340/172.5 |
| 3,896,418 | 7/1975 | Brown | 340/172.5 |
| 3,939,452 | 2/1976 | Faggian | 340/172.5 |

OTHER PUBLICATIONS

"Intel MCS-4 Micro Computer Set", Intel Corp., Jan. 1972, pp. 1-12.
Wickes, William E., "A Compatible MOS/LSI Microprocessor Device Family" in Computer Design, July 1973, pp. 75-81.

*Primary Examiner*—Melvin B. Chapnick
*Attorney, Agent, or Firm*—Spencer & Kaye

[57] ABSTRACT

In a circuit arrangement for an integrated data processing system, which arrangement is composed of various function blocks formed on integrated circuit chips containing MOS components, the function blocks are distributed among the chips and all of the chips are provided with identical connection zones for permitting connection of a collecting bus. Preferably, all chips are fabricated to have substantially the same degree of circuit complexity.

10 Claims, 14 Drawing Figures

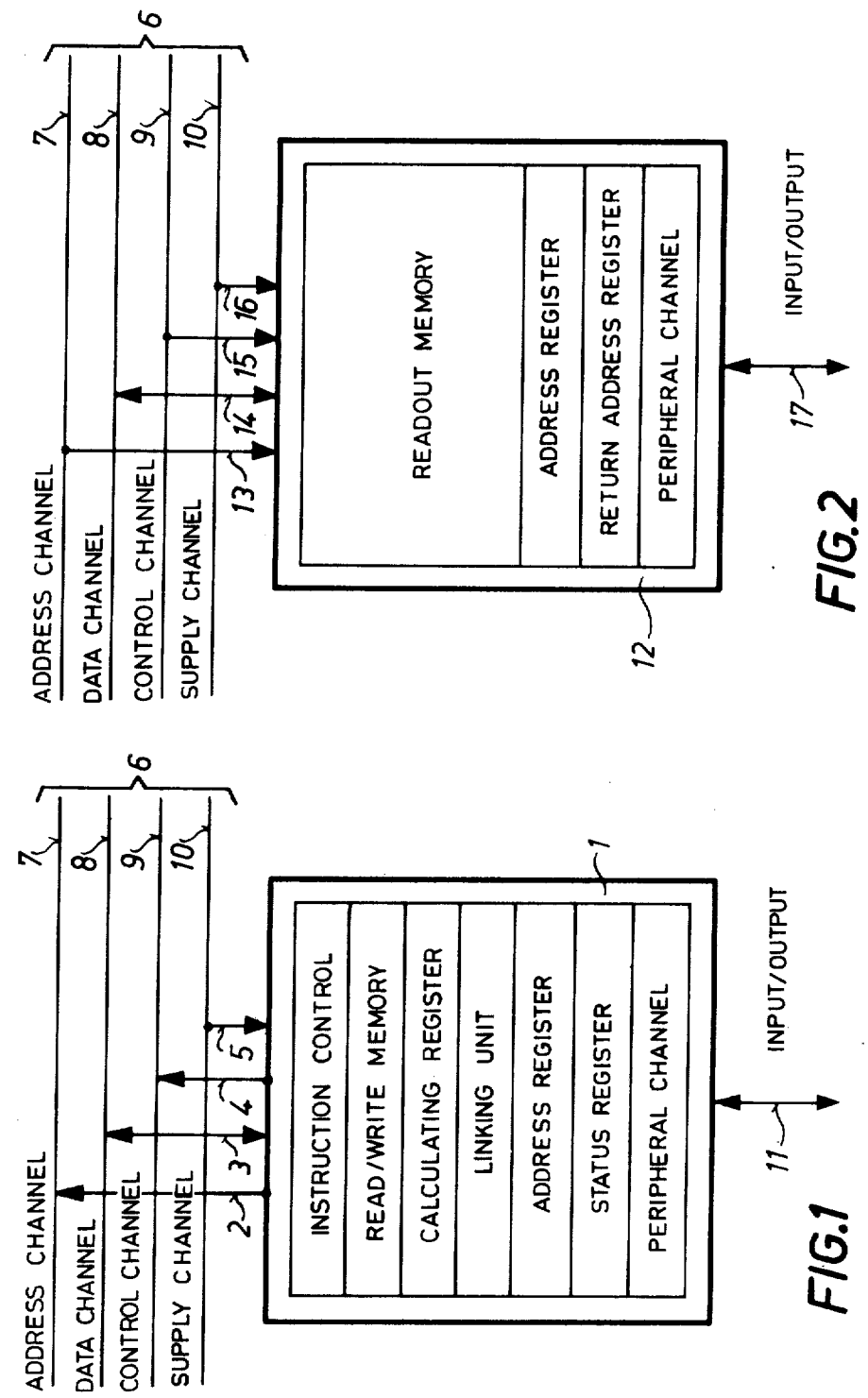

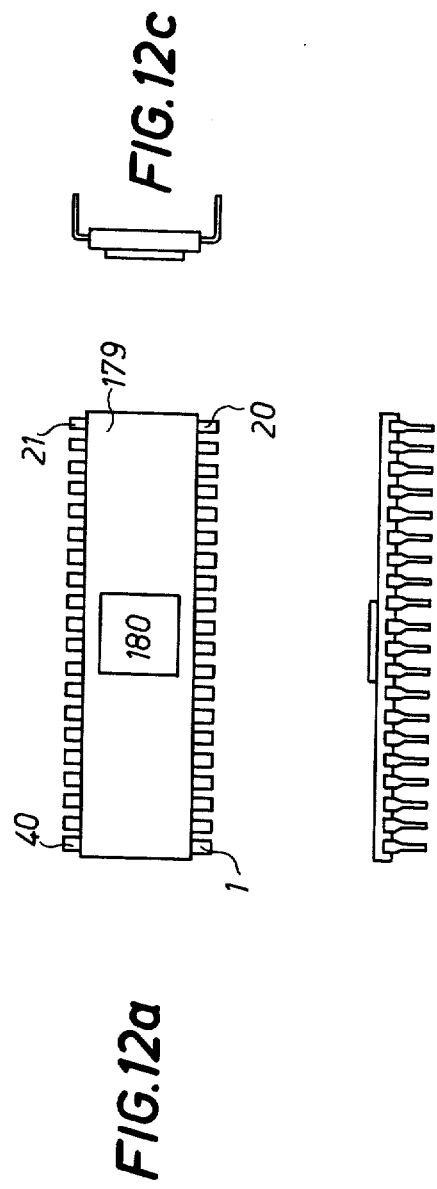

CIRCUIT ARRANGEMENT FOR AN INTEGRATED DATA PROCESSING SYSTEM COMPOSED OF A SMALL NUMBER OF DIFFERENT CHIP TYPES WITH ALL CHIPS DIRECTLY CONNECTABLE TO A COMMON COLLECTING BUS

BACKGROUND OF THE INVENTION

The present invention relates to circuit arrangements for processing alphanumeric data, i.e. data denoting letters and/or numbers, particularly arrangements of integrated components fabricated according to the MOS technique.

In such an arrangement, the components can be arranged in function blocks which include, for example, an address register, a return address register, a status register, a calculating register, an arithmetic-logic linkage unit, an instruction control, a readout memory, a read/write memory and peripheral channels.

In the computer and data processing art it is becoming increasingly common to employ highly integrated LSI (large scale integration) components so that entire circuits are formed on semiconductor chips, to form complete function modules.

A technique which appears to be particularly suitable for such circuits is the MOS technique because it can be employed to form integrated monolithic structures whose individual transistors and resistors, for example, will have very small surface areas, in spite of their high resistance values. Compared to integrated circuits of the bipolar type, a multiplicity of functions can be accomplished by one module fabricated according to MOS techniques.

In previously known embodiments, entire logic circuits have been constructed of circuit components which are disposed on chips. Thus, for example, read-only memories (ROM), reading and writing random access memories (RAM), forward and backward counters, adders, dynamic and static shift registers, decoders and similar circuit components are presently fabricated on individual chips from which the desired logic circuits can be assembled.

Since these circuit components must be capable of being used in circuits of various configurations to assure a wide variety of applications, they can inevitably not be designed to permit direct interconnection of their terminals. Thus, adapter circuits, or interfaces, are required to enable the chips which contain the various circuit components to be interconnected into complete circuits. In addition to level converters these adapter circuits are essentially composed of logic circuits which permit coaction of the components accommodated on the chips with one another and with various peripheral units. Naturally such adapter circuits must be newly designed and fabricated for each new circuit configuration.

SUMMARY OF THE INVENTION

It is an object of the present invention to provide a family of a few integrated chips which can be combined in a simple manner into circuit arrangements for data processing systems of the most varied form and in the most diverse fields of application.

This and other objects are accomplished according to the present invention by distributing such function blocks among two or more chips and arranging the function blocks in such a manner that the chips all have an identical connection zone for connection to a common collecting bus.

The advantages of the present invention are particularly that the chips in this family can be combined, if and as required, in any number without the intermediary of any type of logic adapter circuits to form complete logic circuits for the most varied fields of application. The range of applications is very wide and extends, for example, from simple table model calculators to sophisticated data processing instruments such as bookkeeping and billing machines, automatic printers, terminals and microcomputers. A particular advantage is also that, depending on the requirements placed on the particular instrument or system, more difficult problems merely require a larger number of chips from the family although the family consists of only a very small number of chip types. As a result, the manufacturing costs for the chips are low due to the large number of pieces having the same configuration, storage is simplified and installation is not complicated.

A further significant advantage can moreover be seen in that the manufacturing schedule of a factory can be quickly adapted to new market requirements without high development costs, since it is only necessary that the fixed value stores (ROM's) merely be provided with the appropriate contents by known making processes and/or the combination of the chips be modified.

An advantageous embodiment of the present invention results when the function blocks are distributed among the chips in such a manner that all of the chips possess the same degree of circuit complexity. The manufacturing cost for a chip depend substantially on the degree of complexity of the circuit realized thereon. It is desirable, on the one hand, to accommodate as many circuit components as possible on one chip; on the other hand, however, this increases the degree of complexity. The resulting high component density produces higher numbers of rejects during manufacture and thus increases manufacturing costs. With a given chip size there thus exists an optimum degree of complexity at which — independent of the type of circuit disposed on the chip — the number of rejects does not unduly increase the manufacturing costs. Thus, when the above-mentioned measure is used, so that all chips are of about the same complexity, the manufacturing costs for each chip of the family are approximately the same and this causes disposition, storage and bookkeeping to be further simplified and it is not necessary when designing new systems to independently evaluate the individual chips.

BRIEF DESCRIPTION OF THE DRAWINGS

Embodiments of the present invention are illustrated in the drawings and will be explained in detail below. The drawings show:

FIGS. 1, 2, 3 and 4 are functional symbolized illustrations of a first, second, third and fourth chip, respectively, according to the invention.

FIGS. 12a, 12b and 12c are, respectively, a plan view, side elevational view and an end elevational view of ne embodiment of a standardized chip mounting according to the invention.

DESCRIPTION OF THE PREFERRED EMBODIMENTS

Figure 3:
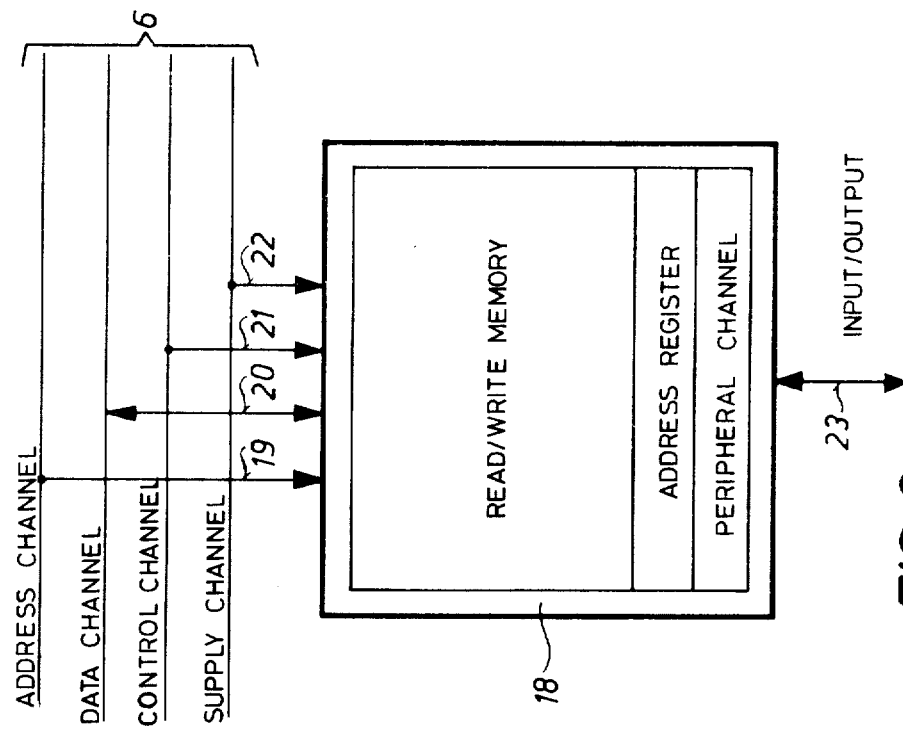

In a first chip 1 of the family, as shown in FIG. 1, the inction blocks include an arithmetic and logic linking nit, an instruction control, a read/write memory, a alculating register, a status register, an address register for memories within the chip, a peripheral channel icluding a plurality of lines, and all lines required to onnect the function blocks together to provide proper peration. With these function blocks the chip constitutes an arithmetic and control unit (RSE) which is onnected, by means of a connection region consisting f channels 2, 3, 4 and 5, to a collecting bus 6. The ollecting bus 6 includes four channels 7, 8, 9 and 10 hich each consist of a plurality of lines required to onduct signals and operating power.

The RSE is the central portion of a logic circuit ormed by a plurality of chips of the family, the logic rcuit exerting control over the sequence of operations ithin the entire circuit. The arithmetic and logic linkig unit performs arithmetic, logic and transfer operaons to link the memory and register contents in the SE, i.e. for example the arithmetic operations $a + b$, $b a$, $a + 1$, $a - 1$, the logic operations of conjunction, isjunction, comparison, shifting, etc.

The read/write memory serves to store the data to be rocessed, which data are fed in by a peripheral device, r example a keyboard, via an input/output channel 11 so part of chip 1 and comprising a plurality of lines. he read/write memory is organized in such a manner iat every word stored therein can be addressed by eans of the address register. The arithmetic operaons are performed between the read/write memory id the calculating register.

The status register serves the purpose of holding data presenting the status from previous operations for bsequent further processes when conditional transfer ders are received.

The instruction control takes care that instructions e read out of a reading memory in the proper seence and are processed within the RSE, or between ie RSE and the memory chips connected to the colcting bus. The nucleus of the instruction control is a ontrol reading memory which contains the address formation belonging to each instruction.

The peripheral channel includes a group of lines hich connects the input/output 11 of chip 1 with the arious function blocks and which possibly contains rcuit elements which designate each line as an input output.

FIG. 2 shows a further chip 12 of the family in the rm of a program storage unit (PSE) which could form ith the RSE the logic circuit for a simple table model alculator. The PSE includes a readout memory, an ddress register, a return address register, peripheral iannels and lines interconnecting these function ocks. In the readout memory of the PSE, words defing programs are permanently stored, during the fabriation of the chip 12, by a known masking process. The PSE thus contains the operating system of the instrument to which the logic circuit belongs: a sequence of micro-orders which are required to realize the basic functions of the device, for example, the keyboard input, the output via the printer, tabulation, line shift, etc. Code tables, application programs or other fixed data may also be stored therein.

The chip 12 containing the PSE is also connected via a connecting zone, including channels 13, 14, 15 and 16 identical to that of the RSE chip, to the collecting bus 6 through which cooperation between the RSE, and PSE, and possibly further chips, takes place. The address register receives addresses coming from the RSE for selecting the contents of memory locations in the readout memory.

If during the sequence of a program, subprograms are to be addressed, an address must be provided in an intermediate memory with which it is possible to relocate the point of interruption in the main program so that it can be completed as soon as the subprogram has been taken care of. For this purpose the return address registers are provided in which the addresses for the points of interruption are stored intermediately.

PSE chip 12 also is provided with an input/output 17 composed of a plurality of lines for the connection of peripheral units. Data fed in by the peripheral devices connected thereto travel through the peripheral channel and the collecting bus 6 to the RSE which takes over the control of the further processing. Data which are supposed to be read out through a peripheral readout unit possibly connected to PSE chip 12 also travel through the RSE and under its control, to the input/output 17 of PSE chip 12.

FIG. 3 shows a third chip 18 of the family which again is provided, in the same manner as the first two chips, with a connection zone 19, 20, 21, 22 for connection to a collecting bus 6, and with an input/output 23 for the connection of peripheral units. This chip 18 presents a read/write memory, address register, peripheral channel and lines interconnecting the function blocks. This chip 18 constitutes the data storage unit (DSE) of the family which can supplement the storage capacity of the read/write memory contained in the RSE for more complex operations. The read/write memory of the DSE is also designed so that a data word forms the smallest addressable unit. The address receives, as already explained in connection with the PSE, addresses coming from the RSE via collecting bus 6 to select memory locations in the read/write memory while the peripheral channel serves the purpose also explained in detail in connection with the PSE.

Figure 4:
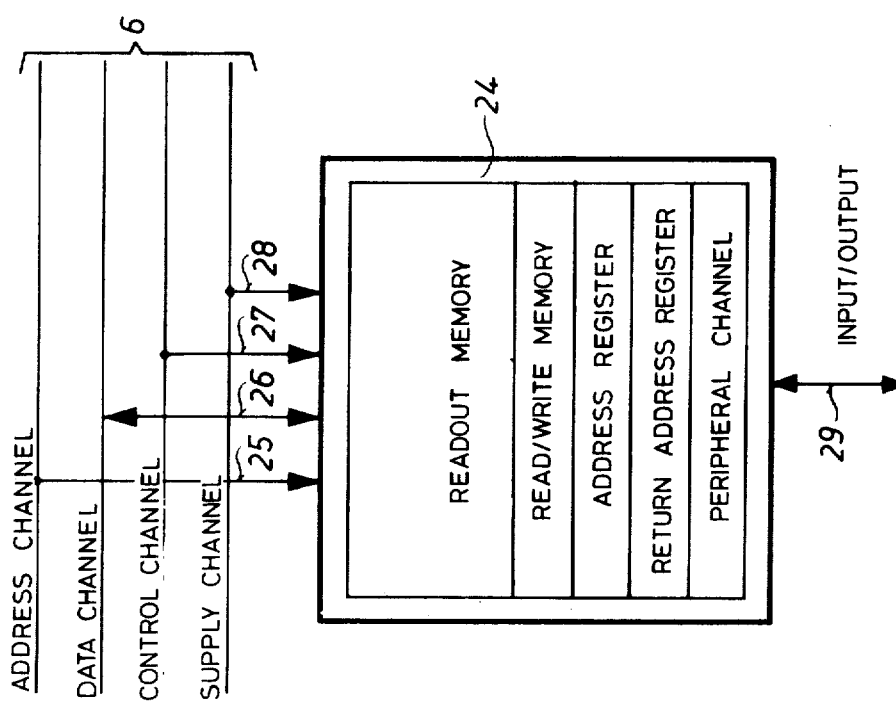

FIG. 4, finally, shows the last chip 24 of the family, which again is connected via a connecting zone including channels 25, 26, 27, 28 to the collecting bus 6 and is provided with an input/output 29 for the connection of peripheral units. As in the case of all of the previously described chips 1, 12 and 18, the peripheral units involved in this case are input and output means such as keyboards, printers, display units, control lamps, picture screens, etc., as well as external storage media such as magnetic tapes, magnetic discs, punched tape, punched cards, core memories or further chips of the family of the present invention.

The last chip 24 forms a program and data storage unit (PDE) and includes — in addition to the address register, peripheral channels and the lines connecting the function blocks, a read/write memory — a readout memory and a return address register. It thus constitutes a combination of program store chip 12 and data store chip 18 and is used in cases where the readout memory of an instrument circuit as well as the read/write memory are to be expanded to a slight degree. All explanations given in connection with the PSE and DSE chips 12, 18 apply equally for the PDE chip 24.

Figure 5:
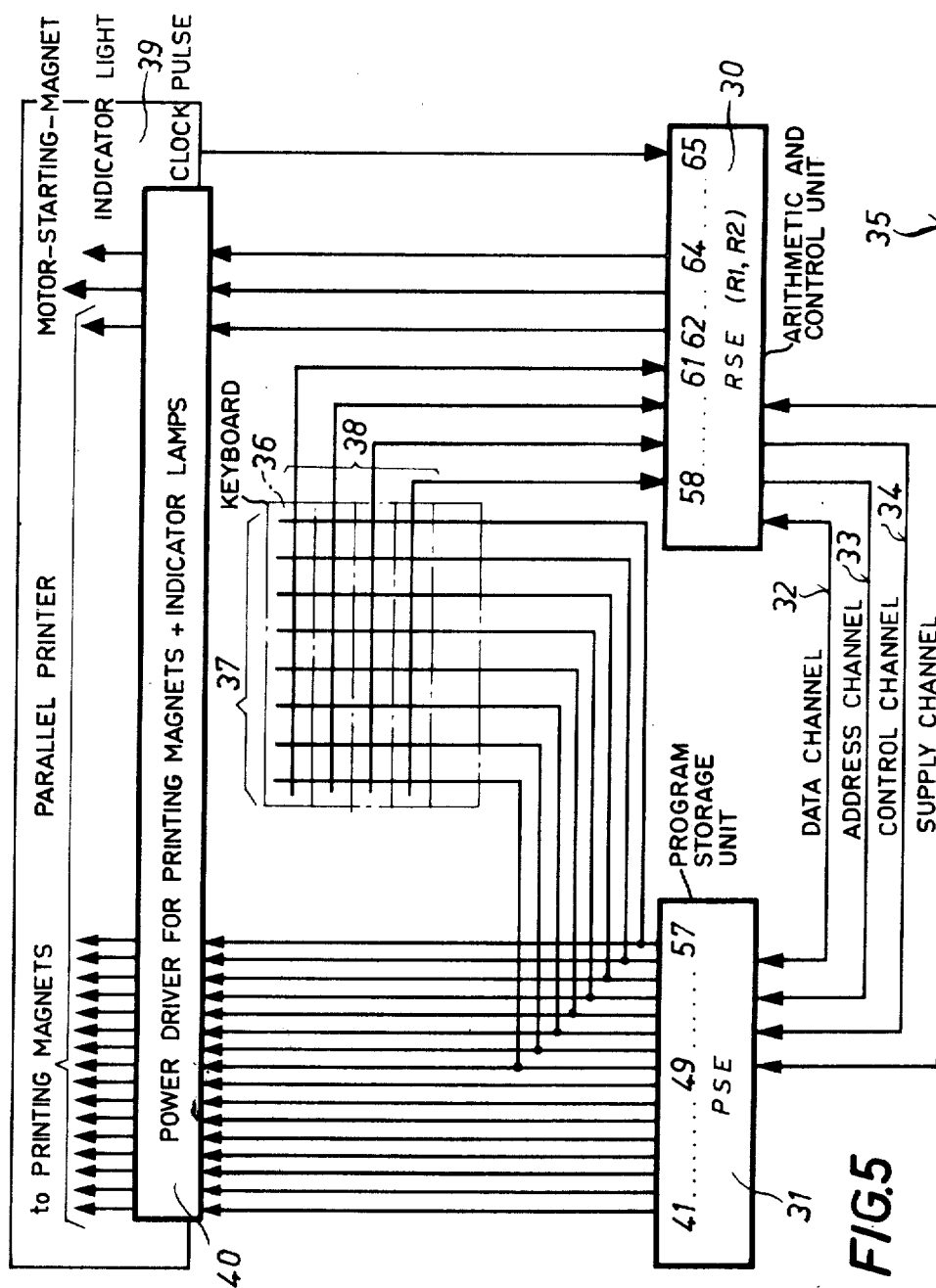
FIG. 5 is a block circuit diagram of a first complete circuit according to the invention.

FIG. 5 is a block circuit diagram of a simple circuit design including an RSE chip 30 and a PSE chip 31 in a circuit of a table model calculator. The two chips are connected together by a collecting bus which was described in connection with FIGS. 1 through 4 and which includes a data channel 32, an address channel 33, a control channel 34 and a supply channel 35. Each channel consists of a plurality of lines. The operation of the data channel 32 is bidirectional so that a data word can be transported in parallel either from the PSE chip 31 to the RSE chip 30 or vice versa.

Memory locations in the PSE chip 31 are addressed by RSE chip 30 via address channel 33 while the required control functions are transmitted through control channel 34 also from RSE chip 30 to PSE chip 31. The supply channel 35 supplies both chips with the required power from a current supply unit and with timing pulses from a clock pulse generator.

The peripheral input is a keyboard 36 which is provided with number keys (0 to 9. comma, sign) and function keys (+, −, ×, ÷, =, %), a total of 32 keys or switches with which each point of intersection of column conductors 37 and row conductors 38 can be conductively connected. The keys and switches as well as the decoupling elements and resistors which are part of the keyboard are not shown for the sake of simplicity.

The peripheral output unit is a 17-position parallel printer 39 provided with 15 number locations and 2 symbol locations. The printer is magnetically actuated and is provided with 17 printing magnets (not shown), which are controlled via line drivers 40. A lamp is also provided which indicates if the number of bits in the result to be printed is greater than the capacity, i.e., number of bit locations, of the printer.

The connection of the RSE chip 30 and the PSE chip 31 to the keyboard 36 and the printer 39 is effected via the inputs or outputs 41 . . . 57 and 58 . . . 65. In the present example the PSE chip 31 is provided with sixteen outputs 41 . . . 57 while the RSE chip 30 has five inputs 58 . . . 61 and 65 and three outputs 62, 63 and 64.

Figure 6:
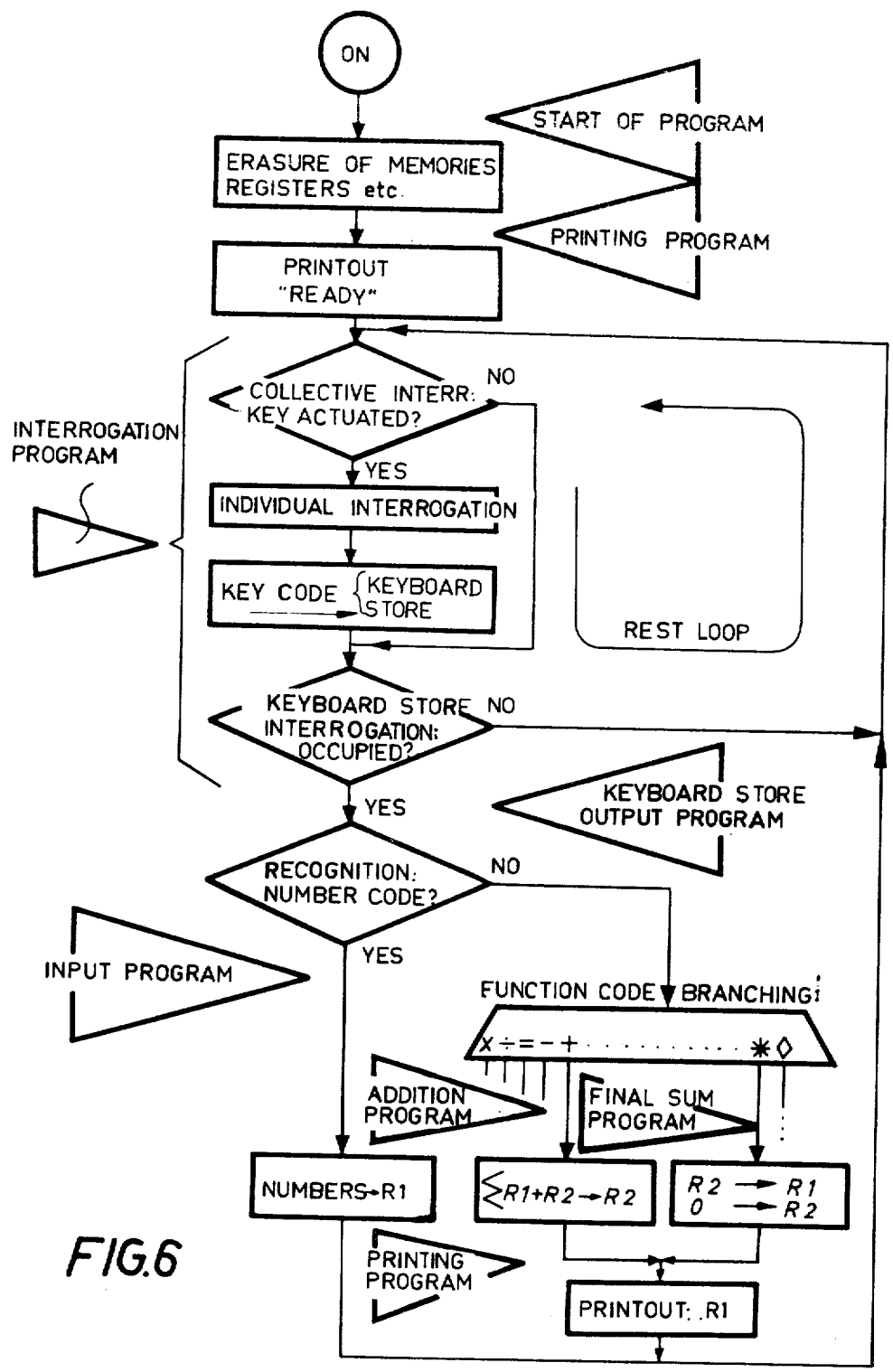
FIG. 6 is a flow chart depicting the functions performed by the circuit of FIG. 5.

The operation of a table model computer as shown in FIG. 5 will now be described with reference to FIG. 6. By switching on the table model calculator, the operating program (microprogram) contained in the readout memory of the PSE chip 31 is started, under control of suitable hardware, at a predetermined memory address. In the case of this table model calculator, the program controls all of the input processes from the keyboard into the read/write memory of the RSE chip 30, as well as their arithmetic processing, depending on the given function, and the output of the result, by producing the signal sequences required for the printer and by their availability at the input/output lines 41 . . . 57. The program which is now running causes, via data channel 32, erasure of the read/write memory of the RSE chip 30, and the calculating registers, as well as of all auxiliary stores and intermediate stores, including marker cells, step counters, keyboard stores for the intermediate storage of functions and numbers, etc. A printout by printer 39 then indicates the operationl readiness of the table model calculator.

After being started, the program circulates in a rest loop. This means that the contents of the memory locations of the readout memory in PSE chip 31 (microprogram steps) are called by the address register, whose content is continuously advanced by one bit value at a time by counting pulses, and are enabled for possible processing. During the circulation of the program in the rest loop a repeated interrogation takes place whether a key in keyboard 36 has been actuated or whether a function or number representation has been intermediately stored in the keyboard store.

This interrogation program is divided into three sections:

1. A collective interrogation with which it can be determined that a key has been actuated. This interrogation consists of the parallel output of L signals through outputs 49 . . . 57 of the PSE chip 31 which are connected with the column lines of keyboard 36 and thereafter the return information about the state of the keyboard to inputs 58 . . . 61 of the RSE chip 30. If a key contact is closed, i.e., if an L signal appears at inputs 58 . . . 61, the interrogation program will initiate an individual interrogation.

2. The individual interrogation is controlled by the program and involves causing the L signal alternate from output to output (49 . . . 57) until an answer is received. From the output of PSE chip 31 which shows the input signal, and from the input of RSE chip 30 which receives the answer, the program recognizes which key has been actuated.

3. The keyboard store interrogation program checks the capacity of the intermediate store (keyboard store) contained in the read/write memory of the RSE chip 30 where function and number codes provided by the keyboard are stored. The keyboard store program deposits the keyboard code in the next free memory location and increases the deposit address as a preparation for the next input.

The interrogation of the keyboard requires so little time that the printing magnets which are also connected to the inputs/outputs 49 . . . 57 — and which are much slower — do not respond.

If the keyboard store contains at least one keyboard code, the program circulating in the rest loop is branched off and a keyboard store output program is caused to read out the first one of the intermediately stored codes and then a check is made whether this is a number or function code.

If numbers are located, an input program effects the storage of the number code in a part of the read/write memory of the RSE chip which is designed as the input-/output register R1. The program sequence then ends with a transfer into the rest loop. If, however, functions are determined, the program directs transfers into the corresponding function programs. This produces computation of the fed-in numbers.

The "addition" function code (+), for example, causes words designating numerical values fed into two sections of the read/write memory, which sections are designed as registers R1, R2, to be added by an addition program, with the result being written into one of the registers R2 and the second summand which has been added to the first summand being printed out by the printing program. The program sequence then also ends with a transfer into the rest loop.

If the result of the addition is to be printed out, the Total" (*) key is actuated. The associated function rogram causes the addition result to be transferred to 1e input/output register R1 of the read/write memory, 1e calculating register to be erased to prepare it for a renewed addition of numbers, and the contents of the 1put/output register R1, i.e., the result, to be printed ut. Then the program again returns into the rest loop.

Independent of the sequence of a function program, 1e interrogation of the keyboard as described above 1kes place in order to assure that all inputs are registered even during a printing process. The short-term 1terruption of the function program required for this 1urpose has no influence on the relatively slowly acting 1rinting magnets. Thus it is possible to utilize slower, 1nd thus less expensive, printers and to eliminate a .eyboard block.

Figure 7:
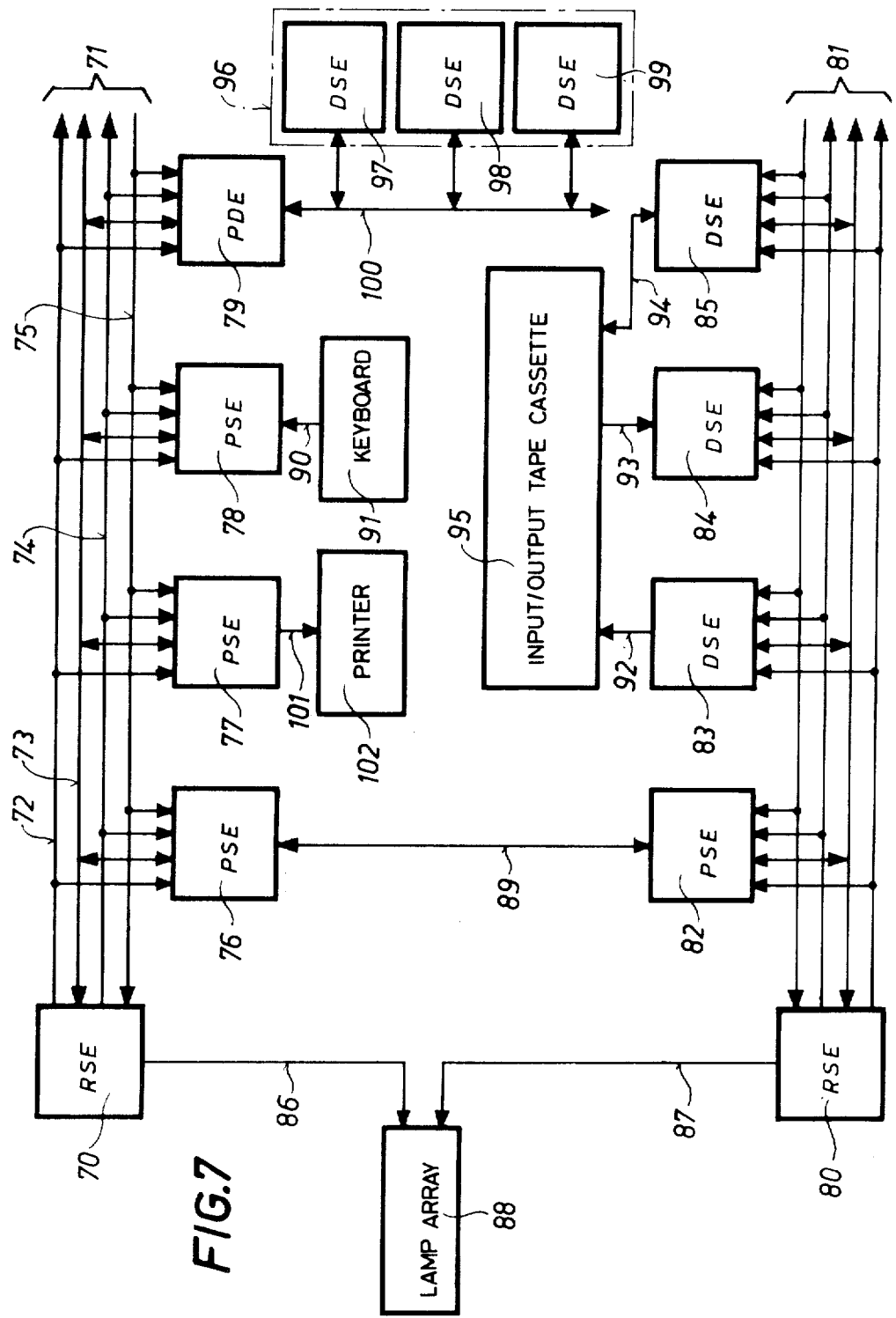
FIG. 7 is a block circuit diagram of a second complete circuit according to the invention.

FIG. 7 shows an example of the way a circuit arrangement for an instrument in the data processing art can be realized for complex purposes with a plurality of chips of the family according to the invention. The collecting bus 71, which has been described above and which leads from a first RSE chip 70 and includes an address channel 72, a data channel 73, a control channel 74 and a supply channel 75, is connected to three 'SE chips 76, 77 and 78 and a PDE chip 79. Also provided is a second RSE chip 80 from which a collecting bus 81 extends to connect to one PSE chip 82 and three DSE chips 83, 84 and 85. The outputs 86, 87 of the RSE chips 70, 80 are in communication with a lamp array 88 which serves to display the various function states or register contents.

Each one of the two systems, which constitute a cooperating circuit structure, thus has its own RSE chip 70, 80 and is controlled by it. The two systems are connected together via the inputs/outputs 89 at the respective first PSE chips 76, 82, through which the exchange of data and instructions takes place in dependence on the microprogram in the respective readout memories of the PSE chips.

The input of data is effected selectively via a keyboard 91 connected to the input 90 of a PSE chip 78 of the first system or via a tape cassette 95 connected to the inputs/outputs 92, 93, 94 of the DSE chips 83, 84, 85 of the second system. Data to be processed and instructions are fed by the keyboard to the RSE chip 70 via the peripheral channel of the PSE chip 78 and the data channel 73 of the collecting bus 71. RSE chip 70 then processes these data and functions in cooperation with the further chips of both systems, via the address channel, the control channel and the data channel. Thus, programmed instructions and data which initiate operations are addressed in the readout memories of the PSE and PDE chips and data stored in the DSE chips are also utilized for processing. In order to enlarge the data storage capacity, a supplemental memory 96 including three DSE chips 97, 98, 99 in connected to the input/output channel 100 of the PDE chip 79 in the first system. This way a very large memory capacity is provided for a multitude of data to be processed.

If the processing of a problem in RSE chips 70, 80 has been completed, subtotals or final totals can be written into the input/output tape cassette 95 or printed out by a printer 102 connected to the output channel 101 of a first PSE chip 77 of the first system, in dependence on the control by the microprogram.

The illustrated embodiments show that circuits for a plurality of the most diverse applications, be they simple or complicated, can be realized from the basic chips of the family according to the invention.

Figure 8:
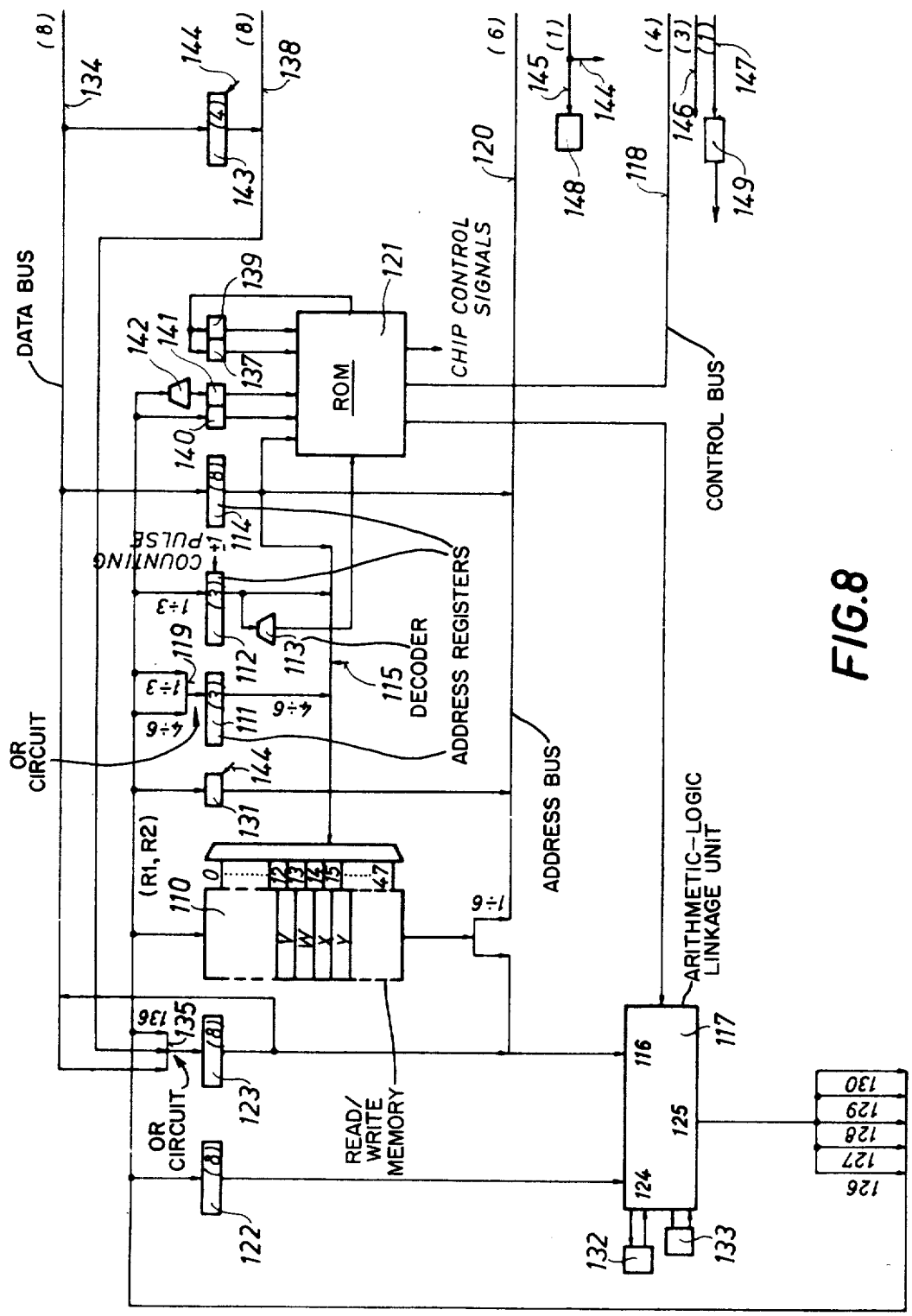
FIG. 8 is a block circuit diagram of one specific embodiment of the functional unit shown in FIG. 1.

FIG. 8 is a block circuit diagram of one embodiment of the arithmetic and control unit RSE of FIG. 1. The read/write memory 110 of the RSE in this embodiment is designed so that 48 words containing 8 bits each can be stored therein and can be either written in or read out of this read/write memory 110. The storage locations for the words are called cells. The memory cells identified in the block circuit diagram with the reference letters V, W, X and Y have a special function which will be explained below.

In order to address one of the maximum of 48 memory cells, a six-digit binary address is required. This binary address is furnished by address registers 111 and 112. Register 111 stores the three highest-valued address bits, while register 112 stores the three lowest-valued address bits. Registers 111 and 112 are flip-flop registers and each includes three flip-flops as indicated by the numbers in parentheses in the address registers 111 and 112 in FIG. 8. The data paths from the address registers 111 and 112 to the read/write memory 110 are identified as 4 ÷ 6 and 1 ÷ 3, respectively, corresponding to the binary value of the address of read/write memory 110. The binary contents of the address registers 111 and 112 can be changed by the running program. The address registers 111 and 112 are thus suited for the indirect addressng of the memory cells.

Address register 112 is a three-stage binary upward or downward counter, respectively, and permits the sequential addressing of a data field. The organization of the read/write memory 110 may also be understood to mean that the address register 111 selects one of the maximum of six data fields while address register 112 selects one word of the maximum of 8 words of the selected data field.

A decoder 113 furnishes a control signal to ROM 121 of the instruction control if it has a binary content equal to 7. This makes it possible to interrogate, with a defined jump order, the end of a data field. The bits 1 ÷ 4 of an instruction register 114 form a second address path to the read/write memory 110. By giving an explicit address in the instruction it is thus possible to address the memory cell containing addresses 0 to 15 directly over this path. In fact, however, only addresses 0 to 11 are being used. Address 12, which is assigned to memory cell V, indicates that indirect addressing of a memory cell is to be effected from address registers 111 and 112. Address 13, which is assigned to memory cell W, indicates indirect addressing and subsequent modification of the contents of the address register 112 by downward counting. Finally, address 14 which is assigned to memory cell X, indicates indirect addressing and subsequent upward counting of the contents of the address register 112. Direct addressing of memory cells V, W, X and Y which are associated with addresses 12 to 15, is also possible. The addressing is effected implicitly, the address is decoded from the instruction code of the respective instructions, as indicated by arrow 115. After selection of a memory cell in the above-described manner, this cell is read out and reaches the operand input 116 of an arithmetic-logic linkage unit 117. The results formed in the arithmetic-logic linkage unit 117 can also be written back into the read/write memory 110 via eight lines of the data path 128 or can reach address registers 111 or 112 as new addresses.

The legend 1 ÷ 3 ahead of the address register 112 indicates that the first, second and third bits, or bits 1, 2 and 3, of output 128 of the arithmetic-logic linkage unit 117 are transferred. An OR circuit 119 is indicated in front of address register 111. Either the bits 1 ÷ 3 of output 128 of the arithmetic-logic linkage unit 117 or the bits 4 ÷ 6 are transferred to the address register 111. The memory cells X and Y of the read/write memory 110 serve to indirectly address a read-out memory, a read/write memory of the peripheral modules of further chips. For this purpose the bits 1 ÷ 6 of memory cells X or Y are connected to an address bus 120.

The arithmetic portion of the unit RSE includes the arithmetic-logic linkage unit 117 in which the actual arithmetic functions are performed and the two buffer registers 122 and 123, which are arranged to act as operand registers. These are eight-digit flip-flop registers, indicated by the numeral 8 in parentheses. The arithmetic-logic linkage unit 117 links two operands which are present at inputs 116 and 124. Their output 125 is connected to a shifting mechanism, here represented by five different parallel data paths 126 to 130, the path 128 forming the RSE internal result bus. Results formed in this manner can be transferred selectively either to the operand registers 122, 123 or to the read/write memory 110 or, if they are addresses, to the address registers 111, 112 or 131.

The operand input 124 of the arithmetic-logic linkage unit 117 is principally fed by the accumulator formed by the operand register 122. The feeding of operands to the operand input 116 is effected selectively from the buffer register represented by operand register 123 or from the read/write memory 110. The type of linkage to be effected between the two operands 116 and 124 is determined by the instruction presently being followed and stored in the instruction register 114. The contents of instruction register 114 are fed for this purpose to ROM 121 of the instruction control which produces therefrom the required control signals for the arithmetic-logic linkage unit 117.

The following operations are possible:
arithmetic functions (inputs 116 + 124, 116 − 124, 116 + 1, 116 − 1);
logic functions (inputs 116 + 124, 116 or 124, 116 exclusive-or 124);
transfer functions (input 124 to output 125, input 116 to output 125);
shifting functions
(input 124: 1 bit to the left;
input 124: 4 bits to the left, no shifting;
input 124: 4 bits to the right;
input 124: 1 bit to the right).

In this sequence the shifting is indicated by the five parallel data paths 126–130 at the output of the arithmetic-logic linkage unit. Both flip-flop registers 132 and 133 store the occurring binary transfers and control the correction addition in decimal operations. Register 132 simultaneously forms the input transfer for the next data byte to be linked in the case of processing of a whole field, i.e. processing with sequential access to the individual bytes. The term "byte" means a group of bits, forming together a word, e.g. a data word. The contents of flip-flop register 132 can be checked by a conditioned jump order.

The buffer register 123 serves as an intermediate store in the transmission of data between the RSE chip and an external chip with a ROM, RAM or peripheral module. Data to be transferred into the RSE unit travel through the data bus 134 and the OR circuit 135 in front of the buffer register 123 to the buffer register 123, while data to be emitted by the RSE unit travel from the buffer register 123 through the data bus 134 to the modules on external chips. The right-hand data path 136 of the OR circuit 135 feeds the buffer register 123 all data to be emitted. The peripheral channel 138 of the RSE unit opens into the center data path of the OR circuit. Peripheral data to be fed in through this channel come to the buffer register and from there via the arithmetic-logic linkage unit 117 to the accumulator 122 of the system.

A condition flip-flop 140 is set if a linkage result contains a zero in bit 8 which is the same as a positive number in binary representation in the scale-of-two complement. A second condition flip-flop 141 is set if the linkage result equals zero. The decoder 142 required for this purpose is indicated at the input of the condition flip-flops 141.

The control mechanism addresses, via address bus lines 120, the module of external chips which is to effect an exchange of data with the RSE. The instructions required for this purpose are furnished by the instruction to be followed, which is presently in instruction register 114. ROM 121 of the instruction control decodes the binary contents of instruction register 114 for this purpose and produces therefrom all the required control signals.

There are two groups of control signals: the RSE internal control values; and the signals for controlling PSE, PDE or DSE functions, and these four control signals are fed to these chips via control 118. Briefly speaking, the control mechanism controls the alternating read-out and performance of the instructions. To read out an instruction, the contents of the three-bit flip-flop register 131 is switched to three address bus lines 120. This results in 8 possible combinations which define the so-called module regions. One module region has the ROM capacity of 2048 instructions and covers two physical chips of the PSE or PDE type. The detailed procedure of selecting an instruction word in the PSE or PDE chips, respectively, will be described in conjunction with the description of the PSE and PDE block circuit diagrams.

The active PSE or PDE module transfers the selected instruction over data bus 134 into the instruction register 114 and into the buffer register 123 of the RSE unit. Thus the instruction reading cycle is completed and processing of the instruction begins. The operands required for this purpose in most cases are present in the accumulator 122 and in the read/write memory 110 of the RSE unit and thus permit the instructions to be internally processed in the RSE unit. The data bus 134 remains unused in this case so that the next instruction can be read in parallel with the processing of the current instruction. If an instruction relates to RAM or peripheral data, the sequence of instruction cycles coming through data bus 134 must be interrupted. The data bus 134 must now be used to transmit RAM or peripheral data, respectively. After that it will again be available to read out the next instruction.

The selection of RAM or peripheral data is effected by different addresses at the address bus 120. A maximum of 64 peripheral channels or 64 RAM modules on external chips can be addressed. Two types of addressing can be used in this case.

In the first type, the so-called direct module addressing, the bits 1–3 of the instruction register 112 are switched to bits 1—4 of the address bus 120. Bits 4, 5 and 6 are automatically set to 1. This shows that, depending on the binary value, only module addresses between 56 and 63 can be addressed.

The second type of addressing, the so-called indirect addressing of RAM or peripheral modules on external chips in the range between 0 and 63, is effected from data cells X or Y of the read/write memory 110. Bits 1–6 of data cells X or Y, respectively are switched to the address bus 120 for this purpose. An instruction operating with external data is processed in a maximum of 4 machine cycles. The control mechanism employs cycle counters 137 and 139 for this purpose.

The RSE unit has a peripheral channel 138 for feeding in 8 data bits or reading out 4 data bits, respectively. In order to read out the data bits, the contents of the accumulator 122 are brought through the arithmetic-logic linkage unit 117 into the buffer register 123, before it is transferred via data bus 134 into a read-out register 143.

The peripheral channel 138 of the RSE unit differs from the channels of the other chips which provide a possibility for input as well as output over the entire channel width of 8 bits. It also has the capability of receiving an input over the entire channel width of 8 bits, but the output capability is limited to bits 5–8. Only these bits can be used, for example, via amplifiers, to operate lamps or magnetic stations of peripheral instruments. The peripheral outputs are bistable and remain in the preset state until new information is transferred to the output register 143.

When the system is switched on the output register 143 is automatically set to zero by a "start" signal, indicated by the arrow 144. It is thus assured that when the system is switched on, connected peripheral units will not inadvertently start functioning. The "start" signal will be explained in detail below. The flip-flop positions of the output register 143 can be interrogated at any time via the input path 138 to the buffer register 123.

The points of interconnection for the RSE unit can be seen at the right edge of FIG. 8. The numeral indications in parentheses refer to the number of contacts associated with the respective illustrated interconnection point. The system points of interconnection which are common to all chips, the so-called module bus, includes the eight contacts of the data bus 134 the six contacts of the address bus 120, the four contacts of the control bus 118, the "start" signal 145 contact, the three operating voltage contacts 146 and the one system clock pulse contact 147. This brings the total number of contact terminals in the module bus to 23.

The data bus 134 is designed to be bidirectional, i.e., the transfer of data is possible in both directions. The data (bytes) are transferred serially, while the bits of a byte are transferred in parallel. The address bus 120 serves the RSE unit to select the module on other chips with which data are to be exchanged via data bus 134. The required control instruction for the selected module, i.e., the directions of transfer, selection of register and type of data to be transferred (characters, instructions, addresses) are furnished by the RSE unit via the control bus 118.

The "start" signal 144, when the system is switched on, constitutes the defined program start at the instruction address 0. The system requires a signal change from 0 to a negative voltage once the voltage supply has reached its minimum operating values. The signal change sets a synchronization flip-flop 148 and starts the program sequence. The "start" signal 144 also erases the RSE address register 131 as well as the address registers of all PSE and PDE units. With this measure the start of the program is assured at the instruction address 0.

In order to provide a time sequence control, the chips require the system clock pulse. The system clock pulse acts in every chip on a two-stage binary counter 149 from which four counting states can be decoded. The four counting states form the so-called machine cycle. The performance of an instruction requires one or up to a maximum of four machine cycles.

Figure 9:
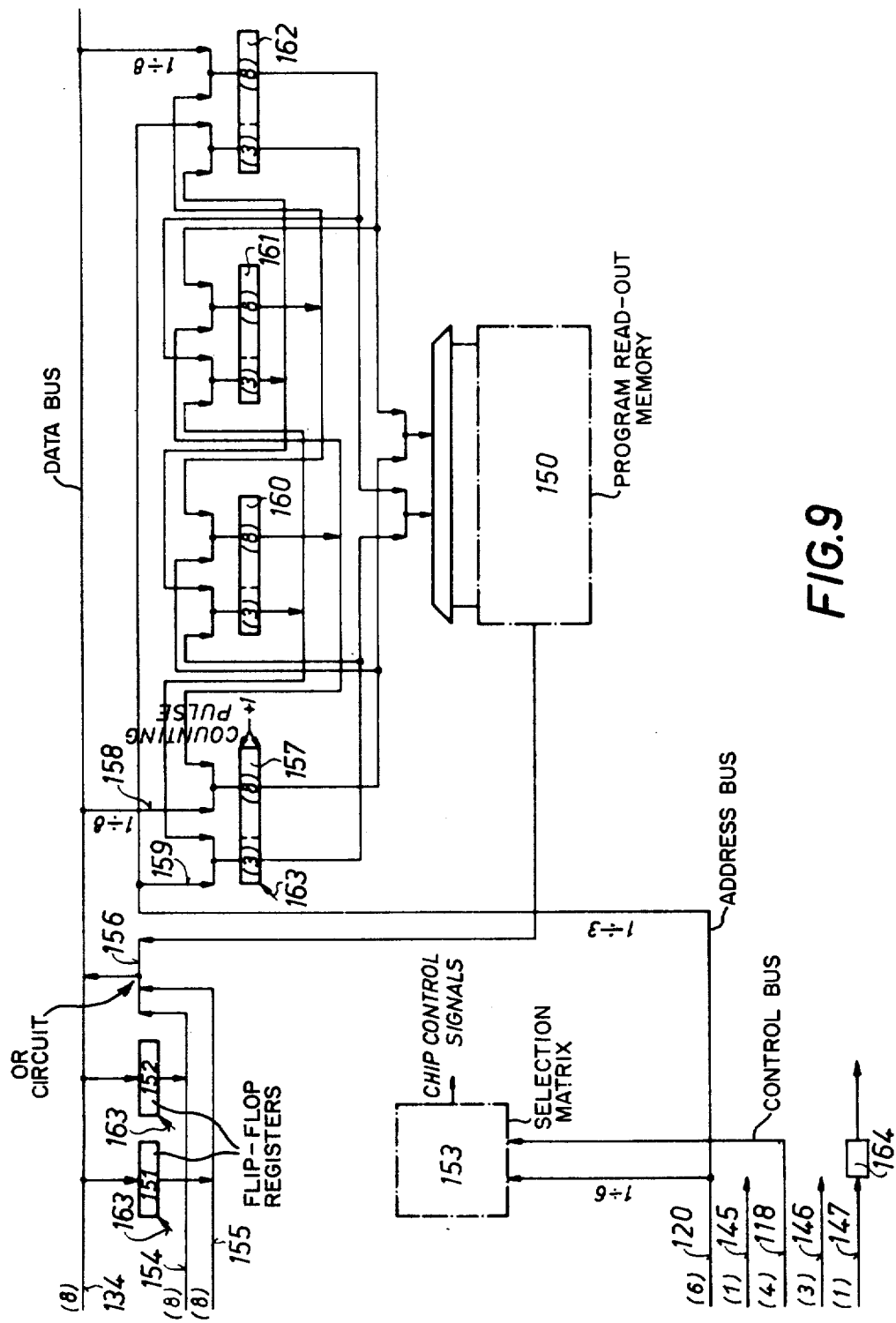
FIG. 9 is a block circuit diagram of one specific embodiment of the functional unit shown in FIG. 2.

FIG. 9 is a block circuit diagram of one embodiment of the program storage unit PSE of FIG. 2. Such a PSE chip includes a program read-out memory 150, which in the present example is assumed to have a capacity of 1024 bytes of 8 bits each. The read-out memory 150 serves to store microinstructions, macroinstructions and unvarying data (e.g., numbers, text symbols, addresses, code tables). This read-out memory 150 is divided, regarding its addresses, into four modules with 256 bytes each.

The PSE unit also includes two peripheral modules 151 and 152, constituted by flip-flop registers. The user assigns a six-digit binary address between 0 and 63 to each one of the six modules contained in units 150, 151 and 152. The selection is effected in a selection matrix 153 which is stored together with the actual user program by mask programming. The RSE unit selects a module by transmitting the six-digit module address over address bus 120. In the selection matrix 153 of the PSE unit this address is compared with the module address provided by the user and upon coincidence of addresses the corresponding module is activated. The signals which are also transmitted from the RSE unit over the control bus 118 inform the activated module which functions are to be performed. They also effect the generation of the corresponding chip control values. The two peripheral modules or peripheral channels 151, 152 can be seen in the upper left of the block circuit diagram. Flip-flop register 151 corresponds to peripheral channel 1 and flip-flop register 152 corresponds to peripheral channel 2 of the PSE unit.

If peripheral data are to be emitted, the RSE unit transfers these data through data bus 134 into the active discharge register 151 or 152, respectively. These data are now present at the peripheral terminals 154 and 155 until the contents of discharge register 151 or 152, respectively, have been changed by the transmission of new information. In order to peripherally put in data the information present at the peripheral contacts 154, 155 is fed through OR circuit 156 (to the right of register 152) to data bus 134 and through it to the RSE unit.

The memory cells of the read-out memory 150 are addressed according to the addressing scheme. There exists the possibility of addressing up to 64 memory modules through the six lines of the address bus 120. The selection of the bytes in a memory module is effected by an eleven-digit address register 157 associated with the memory module. Bits 1–8 address the bytes within one memory module. The module itself is selected by bits 9 and 10. Thus the selection of the proper instruction has been effected within a PSE chip. Regarding programming techniques it is advantageous, however, to define the page sizes of 2048 bytes. This corresponds to the capacity of two physical PSE chips. Within these pages it is possible to have a linear program sequence and with an eleven-bit jump address every byte can be addressed.

The selection of which one of the two PSE chips becomes active is made by bit 11 of address register 157. The eight memory modules on two PSE chips belonging to a program page form a so-called 2k memory module region (2048 bytes). The selection of one of a plurality of regions is effected by the RSE unit via the address bus 120, lines 4 to 6.

There now follows a description of the PSE functions during the performance of a jump instruction, i.e., branching to any desired instruction address within a module region. The performance of a linear program is effected by sequential addressing of the individual instructions. For this purpose the address contents of the register 157 are continuously increased by 1. The address register 157 performs the function of an eleven-digit upward counter. If a byte with such an address contains a jump instruction, the linear program sequence is interrupted and the jump address contained in the instruction is transferred to address register 157. A jump instruction includes two bytes, which are stored in read-out memory 150 in ascending order.

The performance of an instruction requires three machine cycles. In the first cycle the first half of the instruction is transferred through OR circuit 156 and data bus 134 to the instruction register 114 of the RSE unit. This first half of the instruction contains in its bit 1–3 the upper three bits of the jump address. In the second machine cycle the second half of the instruction of the jump instruction is transferred to buffer register 123 of the RSE unit in the same manner. During the third machine cycle, bits 1–8 of the jump address are transferred from the buffer register 123 via data bus 134 to the lower eight digits of register 157 of the PSE unit. In parallel therewith the three highest-valued bits are transferred from instruction register 114 of the RSE unit via the address bus 120, lines 1 to 3. Two PSE chips, belonging to one 2k module region, store this address in their address registers 157. The selection of one from a plurality of module regions, i.e., one of a plurality of pages of 2048 bytes, is effected via address bus 120, lines 4 to 6. In the block circuit diagram of the PSE unit the data paths 158 for the lower bits 1 ÷ 8 and the data paths 159 for the upper bits 9 ÷ 11 are shown separately. The number of bits (corresponding to the number of lines) is given in parentheses. The number (8) in address register 157 represents the eight bits of the address for selection of a byte in the selected memory module. The parenthetical indication (3) in the address register 157 represents the binary addresses 9–11 for selecting a memory module of a module region.

Registers 160, 161 and 162 are also eleven-digit flip-flop registers and together with register 157 form the so-called address stack, or return address register. The address stack serves to receive the return addresses in the case of subprogram jumps. It stores, in addition to the instruction address for the running program, up to 3 return addresses for a maximum of three subprogram levels. If the running program (which is addressed by register 157) is a subprogram, register 160 receives the interruption address of the higher-level program, increased by 1. If the interrupted program was also a subprogram, register 161 receives the interruption address of the next-higher program level, etc. That means, when a jump address is transferred into register 157, its contents, which has been increased by one, is transferred to register 160, the contents of register 160 move to register 161 and the contents of register 161 moves to register 162. The corresponding data paths can be found in the block circuit diagram.

Upon completion of the subprogram, return to the interrupted, higher-level program is effected by a shift in the stack in the opposite direction. The contents of register 162 are transferred to register 161, the contents of register 161 to register 160 and the contents of register 160 to register 157. With the aid of this address stack a maximum of three subprogram levels are possible in addition to the main program level.

A second addressing path exists for program read-out memory 150 via address register 162. It is shown on the right side of the block circuit diagram of FIG. 9. Register 162 can be loaded directly from data bus 134, and via lines 1 ÷ 3 of address bus 120, with an eleven-digit address. Register 162 is used to address constant data which may be disposed in the same program read-out memory 150 as the controlling program which is addressed by register 157. The reading out of unvarying data is effected over the same path as the reading out of instructions.

The points of interconnection of the PSE unit can be seen at the left margin of FIG. 9. The numerical indications in parentheses relate also the number of contacts of the respective partial points of interconnection. Thus there are — as for the RSE unit — 8 contacts for the data bus 134, 6 contacts for the address bus 120, 4 contacts for the control bus 118, one contact 145 for the "start" signal 144, three contacts for the operating voltages 146 and one contact for the system clock pulse 147. In the PSE unit the "start" signal 144 sets the address register 157 as well as the discharge registers 151, 152 to address 0 at the start of the program, which is indicated by the arrows 163. In this PSE unit the system clock pulse 147 also acts on a two-stage binary counter 164 from which can be decoded four counting states which form the machine cycle.

Figure 10:
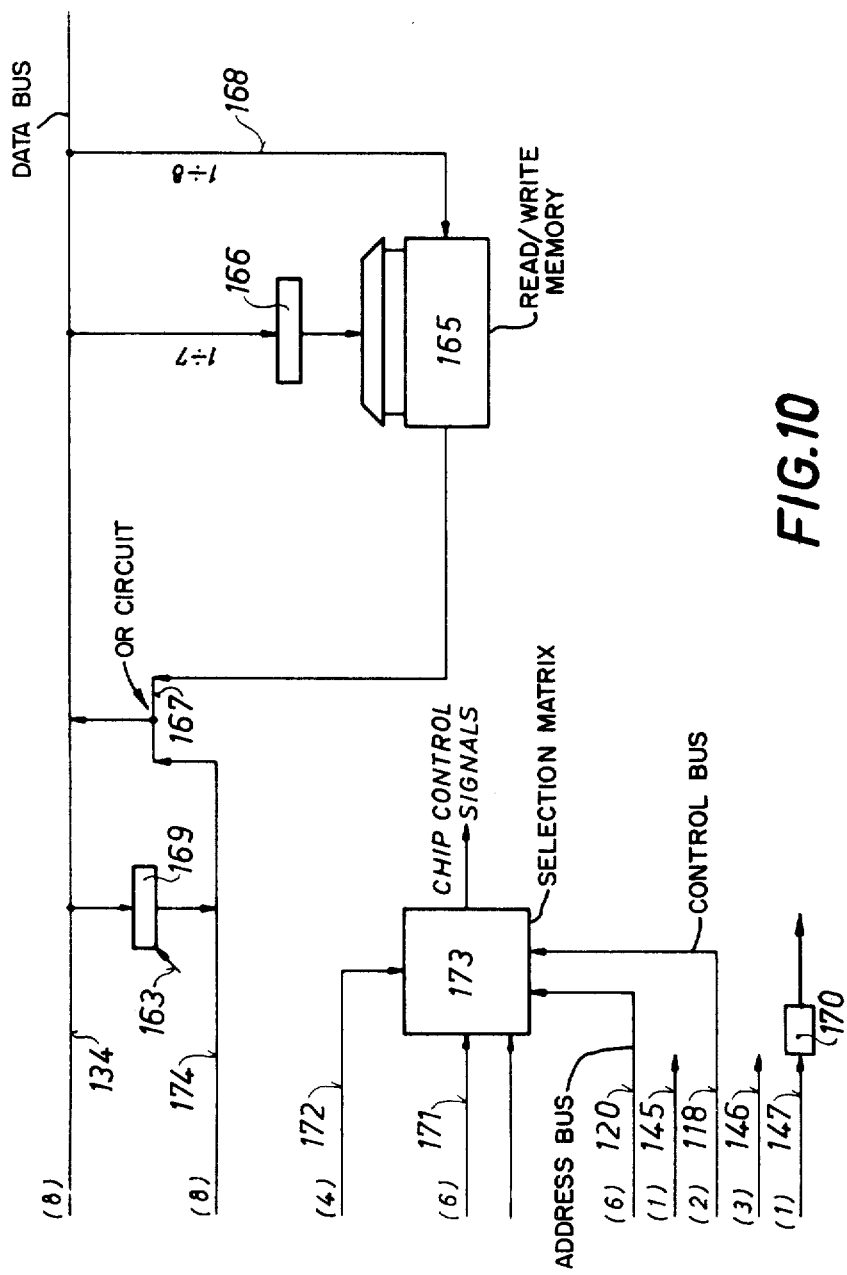
FIG. 10 is a block circuit diagram of one specific mbodiment of the functional unit shown in FIG. 3.

FIG. 10 is a block circuit diagram of one embodiment of the data storage unit DSE shown symbolically in FIG. 3. A DSE chip has a read/write memory module and a peripheral module. In the present example, the read/write memory 165 is assumed to have a storage capacity of 128 bytes with 8 bits each. A seven digit binary address is required to address an 8-bit word. This address is transferred from the RSE unit via lines 1–7 of data bus 134 to an address register 166. The data input paths from the read/write memory 165 are combined to the left of register 166. They connect into data bus 134 which transfers the data to be read in into the buffer register 123 of the RSE unit of FIG. 8. Data to be stored in the read/write memory 165 move from buffer register 123 of the RSE unit through data bus 134 and the write-line 168 into the read/write memory 165. The transfer of peripheral data from data bus 134 into an output register 169 is also possible. The output register 169 leads to the connection terminals 174 of the peripheral module.

The chip points of interconnection of the DSE unit are shown along the left side of FIG. 10. The DSE unit requires 40 contact terminals. Of these, 21 terminals are occupied by the module bus. These are the 8 lines of data bus 134, the 6 lines of address bus 120, two lines of control bus 118, the starting state conductor 145, the voltage supply line 146 and the system clock pulse line 147 which again acts on a two-stage binary counter 170 for the machine cycle.

Two of the four lines of control bus 118 are sufficient to control the DSE functions. Consequently only 21 of the 23 module bus contacts are connected.

Ten further contacts must be connected by the user. Six contacts 171 provide the user with a possibility to feed in the read/write memory module address. Over four contacts the user can assign an address to the peripheral module. The contacts used by the user lead to a selection matrix 173 which produces the chip control values in dependence on the signals supplied hereto.

The RAM or peripheral module of the DSE unit becomes active if the address given by external contact connection coincides with the address transmitted over the address bus. Only then are those chip control values generated which are required to transfer data between the selected module and the RSE unit.

In contradistinction to the PSE chips, and the PDE chips which will be described in detail below, the DSE chips are never changed. In the PSE chip as well as in the PDE chip the read-out memory 150, 175 and the selection matrix 153 can be changed by changes in the mask during the production of the chip while the selection matrix 173 of the DSE chips remains unchanged.

Large data storage systems can also be realized with a plurality of DSE chips. In this case the system is externally connected to addresses in ascending sequence.

Figure 11:
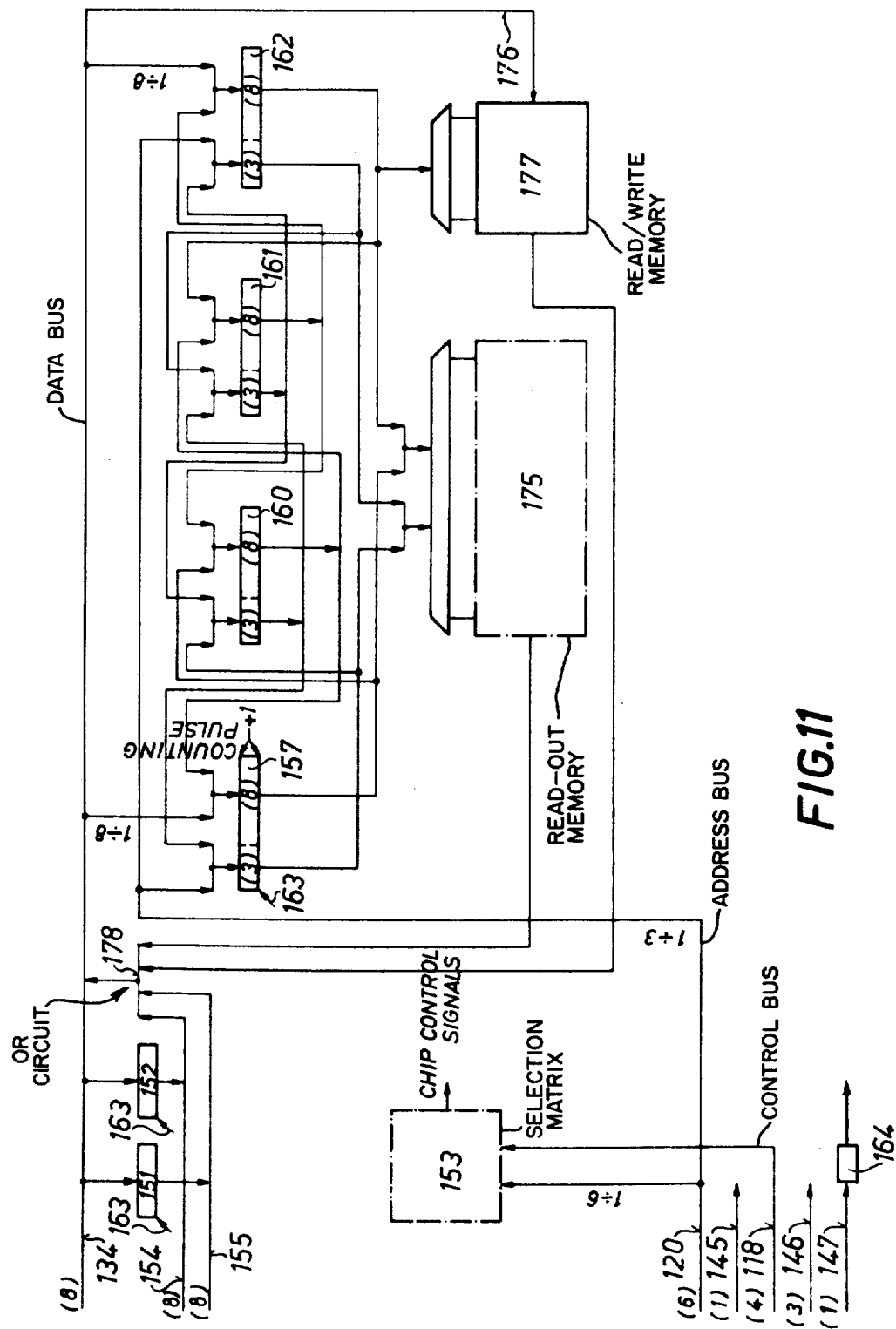
FIG. 11 is a block circuit diagram of one specific mbodiment of the functional unit shown in FIG. 4.

FIG. 11 is a block circuit diagram of one embodiment of the program and data storage unit PDE shown symbolically in FIG. 4. In addition to a read-out memory 175 which in the present case is assumed to have a storage capacity of 768 bytes having 8 bits each, the PDE unit includes a read/write memory 177 with a capacity, for example, of 18 bytes having 8 bits each. It constitutes a PSE unit which has been expanded by read/write memory 177 and in which, instead, the read-out memory 175 has been made smaller so that it contains three read-out memory modules and one read/write module.

Thus the description of the PSE unit also applies to the PDE unit which is the reason why the same reference numerals were selected for the same structural groups. The read/write memory module takes the place of the fourth read-out memory module of the PSE unit as far as addressing is concerned. The data in the read/write memory 177 are addressed from address register 162 by means of address bits 1 to 5. The data are written in — as described in connection with the DSE chip — via the write-in line 176. Here, too, the data input path from read/write memory 177 into the RSE unit and the other data input paths are combined in the OR circuit 178. They open into data bus 134 which transfers the data to be written in to the buffer registers 123 of the RSE unit.

The chips are accommodated in standardized 40-pole dual in-line housings 179, in a manner illustrated in FIGS. 12a, 12b and 12c. A recess in the center of the housing, the so-called calotte, accommodates the actual substrate 180. The connecting pins for the housing, terminals 1 through 20 and 21 through 40, are brought to this calotte. The substrate 180 has a connecting zone at its edges with so-called pads. The connection of the pads with the contacts is effected via hair-thin wires and is the duty of the MOS manufacturers. It is effected, for example, by means of cold-soldering as a result of pressure. This so-called bonding is a process which has been known for years in the manufacture of semiconductors. The individual housings 179 are then soldered to circuit boards by means of their terminals. The housings, however, can also be made removable in fittings. Advisably all chips which are connected to a common bus line should also be accommodated on a common conductor plate in order to avoid unnecessary line capacitances.

Examples of the signals applied to housing contacts 1 to 20 and 21 to 40 of FIGS. 12 for each basic chip are set forth below:

| TERMINAL NO. | RSE-CHIP | PSE-CHIP & PDE-CHIP | DSE-CHIP |
|---|---|---|---|
| 1 | POWER SUPPLY | POWER SUPPLY | POWER SUPPLY |
| 2 | START CONDITION | DATA CHANNEL | TIMING PULSE |
| 3 | TIMING PULSE | '' | |
| 4 | | '' | POWER SUPPLY |
| 5 | | '' | '' |
| 6 | DATA CHANNEL | '' | CONTROL CHANNEL |
| 7 | '' | '' | '' |
| 8 | '' | '' | EXTERNAL ADDRESS |
| 9 | '' | '' | '' |
| 10 | '' | | ADDRESS CHANNEL |
| 11 | '' | START CONDITION | EXTERNAL ADDRESS |
| 12 | '' | ADDRESS CHANNEL | '' |
| 13 | '' | '' | ADDRESS CHANNEL |
| 14 | PERIPHERAL CHANNEL | '' | EXTERNAL ADDRESS |
| 15 | '' | '' | '' |
| 16 | '' | '' | ADDRESS CHANNEL |
| 17 | '' | '' | EXTERNAL ADDRESS |
| 18 | '' | TIMING PULSE | '' |
| 19 | '' | CONTROL CHANNEL | ADDRESS CHANNEL |
| 20 | '' | '' | EXTERNAL ADDRESS |
| 21 | '' | '' | ADDRESS CHANNEL |
| 22 | ADDRESS CHANNEL | '' | EXTERNAL ADDRESS |
| 23 | '' | POWER SUPPLY | ADDRESS CHANNEL |
| 24 | '' | '' | PERIPHERAL CHANNEL |
| 25 | '' | PERIPHERAL CHANNEL | '' |
| 26 | '' | '' | '' |
| 27 | '' | '' | '' |
| 28 | | '' | '' |
| 29 | | '' | '' |
| 30 | | '' | '' |
| 31 | | '' | |
| 32 | | '' | START CONDITION |
| 33 | | '' | DATA CHANNEL |
| 34 | | '' | '' |

-continued

| TERMINAL NO. | RSE-CHIP | PSE-CHIP & PDE-CHIP | DSE-CHIP |
|---|---|---|---|
| 35 | CONTROL CHANNEL | " | " |
| 36 | " | " | " |
| 37 | " | " | " |
| 38 | " | " | " |
| 39 | POWER SUPPLY | " | " |
| 40 | " | " | " |

The horizontal lines indicate no connection. PSE chips as well as PDE chips are identically connected while RSE and DSE chips have a different arrangement. The chips of each type of chip are always connected, however, with the same housing contacts to the same lines of the common bus line. In principle, of course, the individual signal inputs can also be placed at other housing contacts so that their connection to the common bus lines would have to be effected in a different sequence.

Other data processing circuits which can be produced according to the present invention are of the types disclosed in: German Offenlegungsschrift (Laid-Open Application) No. 2,262,725, laid open on Aug. 9th, 1973; German Offenlegungsschrift No. 2,235,436, laid open on Feb. 1st, 1973 and corresponding to U.S. Pat. No. 3,775,214; and German Offenlegungschrift No. 2,228,742, laid open on Dec. 21st, 1972.

Suitable MOS fabrication techniques for integrated data processing units according to the invention are disclosed, for example, in the text MOSFET in Circuit Design, Robert N. Crawford (McGraw-Hill Book Co., 1967); and in the publication "MOS-Technologies" by the SGS firm, published in Feb., 1972.

It will be understood that the above description of the present invention is susceptible to various modifications, changes and adaptations, and the same are intended to be comprehended within the meaning and range of equivalents of the appended claims.

We claim:

1. In a circuit arrangement for an integrated data processing system, which arrangement is composed of a plurality of integrated circuit chips each carrying a plurality of circuit components interconnected to define function blocks which include first, second and third address registers, at least one further address register, a status register, a calculating register, an arithmetic-logic linkage unit, an instruction control containing a data read-only memory, a readout memory constituting a source of microprogram instructions for controlling the sequence of operation of said circuit arrangement, a read/write random access memory, and peripheral interconnection channels, the arrangement further including a collecting bus connected between the chips for interconnecting their respective function blocks, the improvement wherein said arrangement includes two such chips, with a first one of said chips constituting an arithmetic and control unit and carrying the circuit components defining said first and second address registers, said status register, said calculating register, said arithmetic-logic linkage unit, said instruction control, said read/write random access memory connected to operate as a data store, and a first one of said peripheral channels connected for selectively effecting parallel transmission of information bytes into or out of said arithmetic and control unit in dependence on the operation being performed under control of the microprogram, said first chip further carrying conductors interconnecting said function blocks on said first chip, said conductors carried on said first chip including first conductor means interconnecting said first address register and said random access memory for enabling the memory locations of said random access memory to be addressed by the content of said first address register, second conductor means interconnecting said instruction control and said second address register for enabling said instruction control to be addressed by the content of said second address register, and third conductor means interconnecting said status register and said arithmetic-logic linkage unit for enabling said status register to store information produced by said linkage unit and determining a subsequent operating sequence of said circuit arrangement, and with a second one of said chips constituting a program storage unit and carrying the circuit components defining said third address register, said at least one further address register, said readout memory, and a second one of said peripheral channels connected for selectively effecting parallel transmission of information into or out of said program storage unit in dependence on the operation being performed under control of the microprogram, said second chip further carrying conductors interconnecting said function blocks on said second chip, said conductors carried on said second chip including fourth conductor means connecting said third address register to said bus for selectively setting the stages of said third address register in parallel or supplying counting pulses to said third address register to cause it to count through a succession of binary values, and fifth conductor means interconnecting said third and further address registers to form an address stack for intermediate storage of the previous content of said third register in said further register during execution of a subprogram jump by said circuit arrangement.

2. Circuit arrangement as defined in claim 1 wherein said function blocks are distributed among said chips in such a manner that all of said chips have the same degree of circuit complexity.

3. Circuit arrangement as defined in claim 1 wherein each said chip is provided with a plurality of peripheral connection terminals defining a peripheral connection zone for connection to peripheral components of the system and connected to said peripheral channel of said chip.

4. Circuit arrangement as defined in claim 1 including a third such chip containing circuit components defining a fourth address register, a second read/write random access memory connected to operate as a data store, a third one of said peripheral channels connected for selectively effecting parallel transmission of information to or from said circuit components contained in said third chip in dependence on the operation being performed under control of the microprogram, and conductors interconnecting them, and constitutes a data storage unit, said conductors carried on said third chip including sixth conductor means connecting said fourth address register to said bus for setting the stages of said fourth address register with a complete address byte by parallel transmission of the corresponding bits.

5. An arrangement as defined in claim 4 wherein: said circuit components on said third chip further define a selection matrix for generating control signals for said circuit components on said chips and connected to be selectively addressed via said collecting bus by one of said components carried by said first chip or by an external peripheral device; said conductors carried on said third chip include twelfth conductor means interconnecting said fourth address register and said second random access memory for permitting said second random access memory to be addressed by the content of said fourth address register, and thirteenth conductor means connecting said second random access memory to said collecting bus for selective bidirectional transfer of data into or out of said second random access memory; and said third one of said peripheral channels comprises an output register and is connected for transmitting data from said first chip to external peripheral devices via said output register of said third peripheral channel and said collecting bus and for conducting input data to said first chip from external peripheral devices via said collecting bus.

6. Circuit arrangement as defined in claim 1 wherein said second chip further carries circuit components defining a fifth address register connected to said collecting bus in order to be set to a selected content by parallel bit transmission and in order to address said read/write random access memory in accordance with its content, and constitutes a program and data storage unit.

7. An arrangement as defined in claim 6 wherein said second chip further carries circuit components defining a third read/write random access memory usable as a data store and connected to said collecting bus to be addressed by said further address register carried by said second chip and to transmit and receive data.

8. Circuit arrangement as defined in claim 1 wherein said collecting bus includes address lines, data lines, control lines and power supply lines.

9. Circuit arrangement as defined in claim 1 wherein said components are fabricated according to the MOS technique.

10. An arrangement as defined in claim 1 wherein: said first conductor means are connected for causing said random access memory locations to be selectively addressed indirectly by said first address register under control of the microprogram; said conductors carried on said first chip further include seventh conductor means interconnecting said second address register and said random access memory for permitting said random access memory to be selectively directly addressed by said second address register, eighth conductor means interconnecting said random access memory and said arithmetic-logic linkage unit for permitting the contents of a selected location of said random access memory to be conducted as an input to said arithmetic-logic linkage unit, and ninth conductor means interconnecting said instruction control read-only memory and the other said circuit components carried by said first chip and connecting said instruction control read-only memory to said collecting bus for emission of control signals from said instruction control read-only memory to all of the other function blocks of said arrangement; there are two of said calculating registers on said first chip, and said arithmetic-logic linkage unit is connected to selectively receive input signals from said calculating registers and to selectively supply output signals to one of said calculating registers, said random access memory and said first address register; there are a plurality of said status registers connected by said third conductor means to said arithmetic-logic linkage unit; said first one of said peripheral channels comprises an output register and is connected for transmitting data to external peripheral devices from said arrangement via said output register and said collecting bus and for conducting input data from external peripheral devices to one of said calculating registers; said fourth conductor means are connected for setting the stages of said third address register by data supplied from one said circuit component carried by said first chip; there are a plurality of said further address registers connected to said third address register to form said address stack; said conductors carried on said second chip further include tenth conductor means connecting said third register and one of said further registers to said readout memory for permitting said readout memory to be selectively addressed by said third register or said one of said further registers, and eleventh conductor means connecting the input of said one of said further registers to said collecting bus for transmission of signals to set the contents of said one of said further registers; and said second one of said peripheral channels comprises a plurality of peripheral channels each containing a respective output register and connected for transmitting data from said first chip to external peripheral devices via said output registers of said second peripheral channels and said collecting bus and for conducting input data to said first chip from external peripheral devices via said collecting bus.

* * * * *